(12) United States Patent
Ben-Shalom et al.

(10) Patent No.: US 9,705,916 B2
(45) Date of Patent: Jul. 11, 2017

(54) INTEGRATING WIRELESS INPUT FUNCTIONALITY INTO SECURE ELEMENTS

(71) Applicant: Intel Corporation, Santa Clara, CA (US)

(72) Inventors: Omer Ben-Shalom, Rishon le-Tzion (IL); Alex Nayshtut, Gan Yavne (IL); Moshe Maor, Kiryat Mozking (IL)

(73) Assignee: Intel Corporation, Santa Clara, CA (US)

( * ) Notice: Subject to any disclaimer, the term of this patent is extended or adjusted under 35 U.S.C. 154(b) by 616 days.

(21) Appl. No.: 13/629,965

(22) Filed: Sep. 28, 2012

(65) Prior Publication Data

US 2014/0094121 A1 Apr. 3, 2014

(51) Int. Cl.
*H04B 7/00* (2006.01)
*H04L 29/06* (2006.01)
*H04L 29/08* (2006.01)

(52) U.S. Cl.
CPC ............ *H04L 63/164* (2013.01); *H04L 63/18* (2013.01); *H04L 69/32* (2013.01)

(58) Field of Classification Search
CPC ........ H04L 63/164; H04L 63/18; H04L 69/32
USPC .......................................................... 455/41.2
See application file for complete search history.

(56) References Cited

U.S. PATENT DOCUMENTS

| 2006/0165075 | A1* | 7/2006 | Ankala | H04L 12/24 370/389 |
| 2007/0027981 | A1* | 2/2007 | Coglitore | H04L 43/0817 709/224 |
| 2011/0052155 | A1* | 3/2011 | Desmarais | H04N 5/76 386/290 |
| 2012/0317183 | A1* | 12/2012 | Husain | G06F 3/14 709/203 |
| 2013/0179685 | A1* | 7/2013 | Weinstein | G06F 21/85 713/168 |
| 2014/0015987 | A1* | 1/2014 | Harple | G06F 3/005 348/207.1 |

* cited by examiner

*Primary Examiner* — Raj Chakraborty
(74) *Attorney, Agent, or Firm* — Jordan IP Law, LLC (57) ABSTRACT

Systems and methods may provide for establishing an out-of-band (OOB) channel between a local wireless interface and a remote backend receiver, and receiving information from a peripheral device via the local wireless interface. Additionally, the information may be sent to the backend receiver via the OOB channel, wherein the OOB channel bypasses a local operating system. In one example, a secure Bluetooth stack is used to receive the information from the peripheral device.

21 Claims, 5 Drawing Sheets

INTEGRATING WIRELESS INPUT FUNCTIONALITY INTO SECURE ELEMENTS

BACKGROUND

Embodiments generally relate to computing security. More particularly, embodiments relate to the integration of wireless input functionality into secure elements of computing platforms.

The ability of malware (malicious software) to gain access to sensitive content may be an issue of concern, particularly given an increase in cloud computing/consumerization and a corresponding reduction in control over the places where content resides. Specifically, malware such as "rootkits" and key loggers, as well as "bring your own" devices that may already be infected present significant challenges to administrators and users of mobile and/or distributed computing environments.

While attempts to protect content and detect malware may have traditionally involved the use of data loss prevention solutions, anti-virus software, host based intrusion detection, and other software based solutions and may have been suitable under certain circumstances, there remains considerable room for improvement. For example, such solutions may often be unable to deal with malware that has system level privileges, wherein the malware has access to the content after it is decrypted for viewing/editing. Indeed, protection of content entered to a computing platform via a wireless peripheral input device may be particularly challenging when system level malware is present due to potential vulnerability of the wireless interface to attack.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
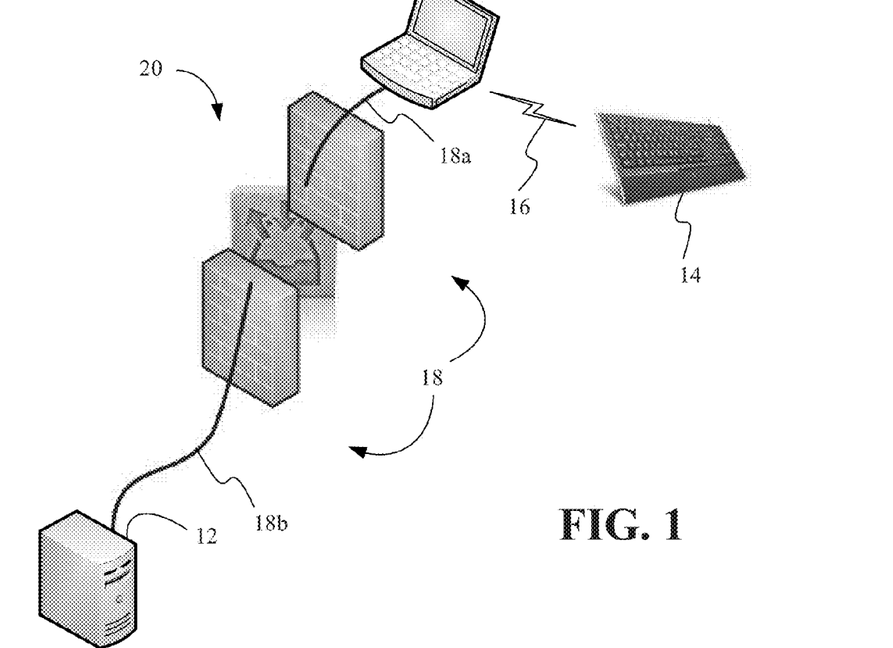
FIG. 1 is a block diagram of an example of a end-to-end out-of-band channel between a backend server and a platform having a wireless interface according to an embodiment.

Turning now to FIG. 1, a scenario is shown in which a peripheral device 14 such as a wireless keyboard is used to enter content/information into a computing platform 10 over a wireless link 16. Other peripheral devices such as microphones, sensors, etc., may also be used to enter information into the computing platform 10. The entered information may be sent to a backend receiver 12, which may use the entered information to provide services such as, for example, e-commerce (electronic commerce), online banking, cloud computing (e.g., remote desktop), etc., services to a user of the peripheral device 14. Of particular note is that the computing platform 10 may potentially be infected with malware that has system level privileges (e.g., operating system/OS privileges). Accordingly, the illustrated solution establishes an out-of-band (OOB) channel 18 (18a, 18b) between a wireless interface of the computing platform 10 and the backend receiver 12, wherein the OOB channel 18 bypasses an OS of the computing platform 10. More particularly, the OOB channel 18 may include an OOB tunnel 18a between the wireless interface associated with the wireless link 16 and a gateway 20 (e.g., Citrix NetScalar gateway), which may maintain an encrypted connection 18b (e.g., transmission control protocol/TCP) with the backend receiver 12.

As will be discussed in greater detail, using the OOB channel 18 to bypass the OS of the computing platform 10 may substantially enhance security with regard to the content entered via the peripheral device 14 and the wireless link 16.

Figure 2A:
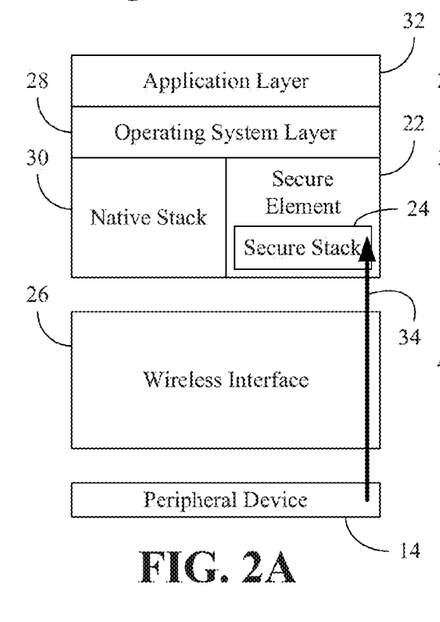
FIGS. 2A and 2B are block diagrams of examples of schemes of receiving information from a peripheral device according to embodiments.

FIG. 2A shows one approach to receiving information 34 from the peripheral device 14. In the illustrated example, a secure element 22 constitutes a secure execution environment such as a security co-processor or input output (IO) controller, where host software and/or drivers of an operating system layer 28 cannot modify the code or functionality of the secure element 22. The secure element 22 may include a secure wireless stack 24 such as, for example a Bluetooth (BT, e.g., Institute of Electrical and Electronics Engineers/IEEE 802.15.1-2005, Wireless Personal Area Networks) stack, NFC (near field communications) stack, etc., that assumes control over a wireless interface 26 so that the operating system layer 28 may no longer access the wireless interface 26 (e.g., wireless controller/radio) via a native (e.g., potentially insecure) wireless stack 30. Accordingly, malware at the level of the operating system layer 28 as well as at an application layer 32 may not be able to gain access to the information 34, in the example shown. Upon receiving the information 34 via the secure wireless stack 24, the secure element 22 may use the OOB channel 18 (FIG. 1) to send the information 34 to the backend receiver 12 (FIG. 1).

Figure 2B:
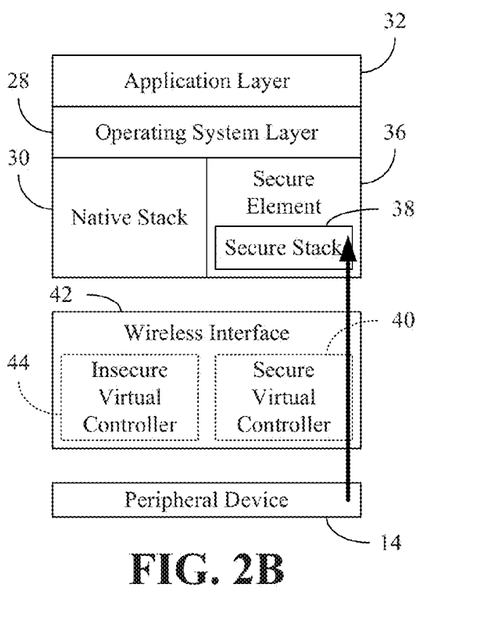

FIG. 2B shows another approach to receiving the information 34 from the peripheral device 14 in which a secure element 36 uses a secure wireless stack 38 to pair the peripheral device 14 with a secure virtual controller 40 in a virtualized wireless interface 42. Thus, in the illustrated example, the operating system layer 28 may continue to use the potentially insecure native wireless stack 30 to access a potentially insecure virtual controller 44 of the wireless interface 42 without compromising information transfer between the peripheral device 14 and the secure element 36. Upon receiving the information 34 via the secure wireless stack 38, the secure element 36 may use the OOB channel 18 (FIG. 1) to send the information 34 to the backend receiver 12 (FIG. 1).

Figure 3:
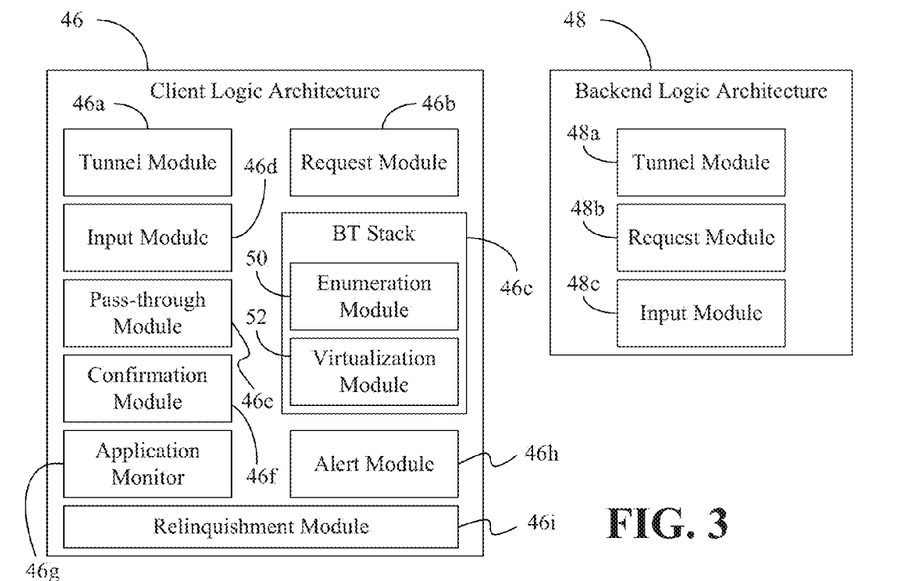
FIG. 3 is a block diagram of an example of a logic architecture according to an embodiment.

Turning now to FIG. 3, a client logic architecture 46 (46a-46i) and a backend logic architecture 48 (48a-48c) are shown. The client logic architecture 46 may execute on a computing platform such as the computing platform 10 (FIG. 1, notebook computer) or other device having computing functionality (e.g., server, workstation, desktop computer, personal digital assistant/PDA, mobile Internet device/MID, smart tablet, smart phone, etc.), whereas the backend logic architecture 48 may execute on a backend receiver such as the backend receiver 12 (FIG. 1, server) or other device having computing functionality (e.g., workstation, desktop computer, notebook computer, PDA, MID, smart tablet, smart phone, etc.).

The illustrated client logic architecture 46 includes a tunnel module 46a to establish out-of-band channels between a local wireless interface and one or more remote backend receivers. Similarly, the backend logic architecture 48 may include a tunnel module 48a to establish out-of-band channels between a local backend receiver and one or more remote wireless interfaces. In the illustrated example, a request module 48b of the backend logic architecture 48 may send a pass-through request to a request module 46b of the client logic architecture 46, wherein the pass-through request is for information entered by a peripheral device associated with the client logic architecture 46 to be sent to the backend logic architecture 48 in a secure fashion. Additionally, the client logic architecture 46 may also include a BT stack 46c configured to set up a local BT (e.g., wireless) interface to securely receive information from the peripheral device.

More particularly, the illustrated BT stack 46c includes an enumeration module 50 to assume control over the local BT interface in response to the pass-through request so that the local OS may no longer use the local BT interface. The BT stack 46c may also include a virtualization module 52 to pair the peripheral device with a secure virtual controller in the local BT interface in response to the pass-through request. In either instance, an input module 46d may receive information from the peripheral device via the local BT interface, wherein a pass-through module 46e may send the information to the backend receiver via the out-of-band channel. Additionally, the backend logic architecture 48 includes an input module 48c to receive the entered information via the out-of-band channel.

In addition to securing the information received via the wireless interface, the illustrated solution may also notify the user that the information input is secure. Accordingly, the client logic architecture 46 may also include a confirmation module 46f to generate a secure input notification that includes a predetermined secret, wherein the predetermined secret may be presented to the user via a device such as, for example, a display device, the peripheral device used to enter the information, and so forth. For example, a protected audio visual path (PAVP) or sprites might be used to reflect the input in a secured output window on the display device (e.g., protected border of the display screen).

The client logic architecture 46 may also include an application monitor 46g that is configured to detect application transitions away from the application involving the secure information entry. In this regard, an alert module 46h may send an alert to the backend receiver via the out-of-band channel in response to the application transition, wherein a relinquishment module 46i may discontinue the bypass of the local operating system in response to such an application transition. The backend logic architecture 48 may use the input module 48c to receive the alert from the alert module 46h.

Figure 4A:
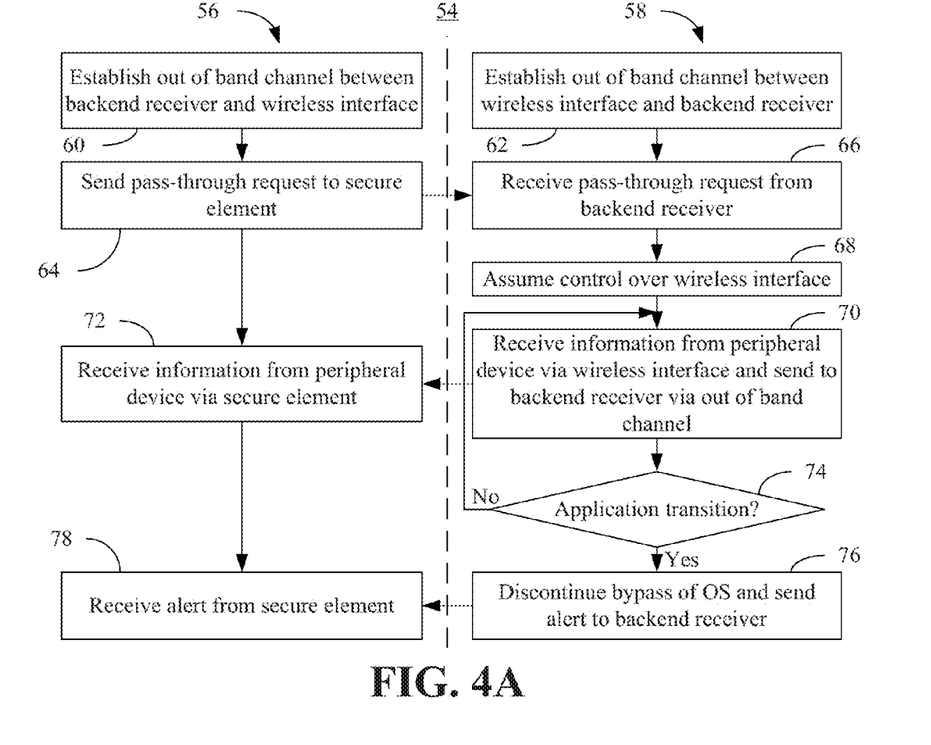
FIGS. 4A and 4B are flowcharts of examples of methods of integrating wireless input functionality into a secure element according to embodiments.

Turning now to FIG. 4A, a method 54 of integrating wireless input functionality into a secure element is shown. The illustrated method 54, which has a backend portion 56 and a client portion 58, may be implemented as a set of logic instructions and/or firmware stored in a machine- or computer-readable medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 54 may be written in any combination of one or more programming languages, including an object oriented programming language such as C++ or the like and conventional procedural programming languages, such as the "C" programming language or similar programming languages. Moreover, the method 54 may be implemented as the client logic architecture 46 (FIG. 3) and/or the backend logic architecture 48 (FIG. 3) using any of the aforementioned circuit technologies.

Illustrated backend processing block 60 provides for establishing an out-of-band channel between a local backend receiver and a remote wireless interface, wherein client processing block 62 may establish the out-of-band channel from the perspective of the wireless interface. As already noted, the out-of-band channel may be established through a secure gateway. Backend block 64 may send a pass-through request to a secure element of the computing platform, wherein the secure element might constitute a secure execution environment such as a security co-processor or IO controller. Illustrated client block 66 receives the pass-through request, wherein client block 68 may provide for assuming control over the wireless interface in response to the pass-through request.

Additionally, client block 70 may receive information from the peripheral device via the wireless interface and send the information to the backend receiver via the out-of-band channel. Block 70 may also provide for generating a secure input notification that includes a predetermined secret shared with a user, and presenting the secure input notification to the user via one or more of a local display device and the peripheral device. In one example, a BT stack of the secure element is used to receive the information from the peripheral device and the out-of-band channel bypasses a local operating system of the client computing platform. Illustrated backend block 72 receives the information from the peripheral device via the secure element.

A determination may be made at client block 74 as to whether an application transition has taken place. If so, client block 76 provides for discontinuing the bypass of the local operating system and sending an alert to the backend receiver in response to the application transition. Illustrated backend block 78 provides for receiving the alert from the secure element via the out-of-band channel.

Figure 4B:
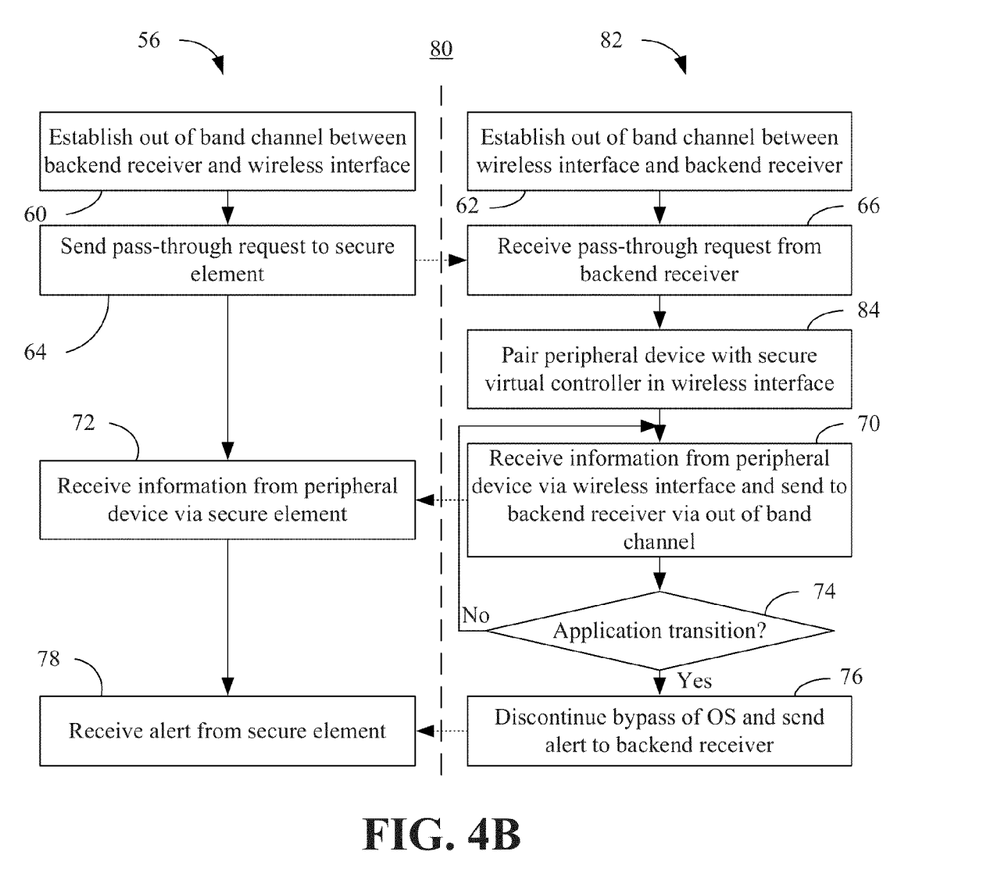

FIG. 4B shows another method 80 of integrating wireless input functionality into a secure element. The illustrated method 80 may include the backend portion 56, as already discussed, and a client portion 82. The client portion 82 may be similar to the client portion 58 (FIG. 4A), with the exception that a client block 84 pairs the peripheral device with a secure virtual controller in the wireless interface. Accordingly, the illustrated approach supports virtualized wireless interfaces, as already discussed.

Figure 5:
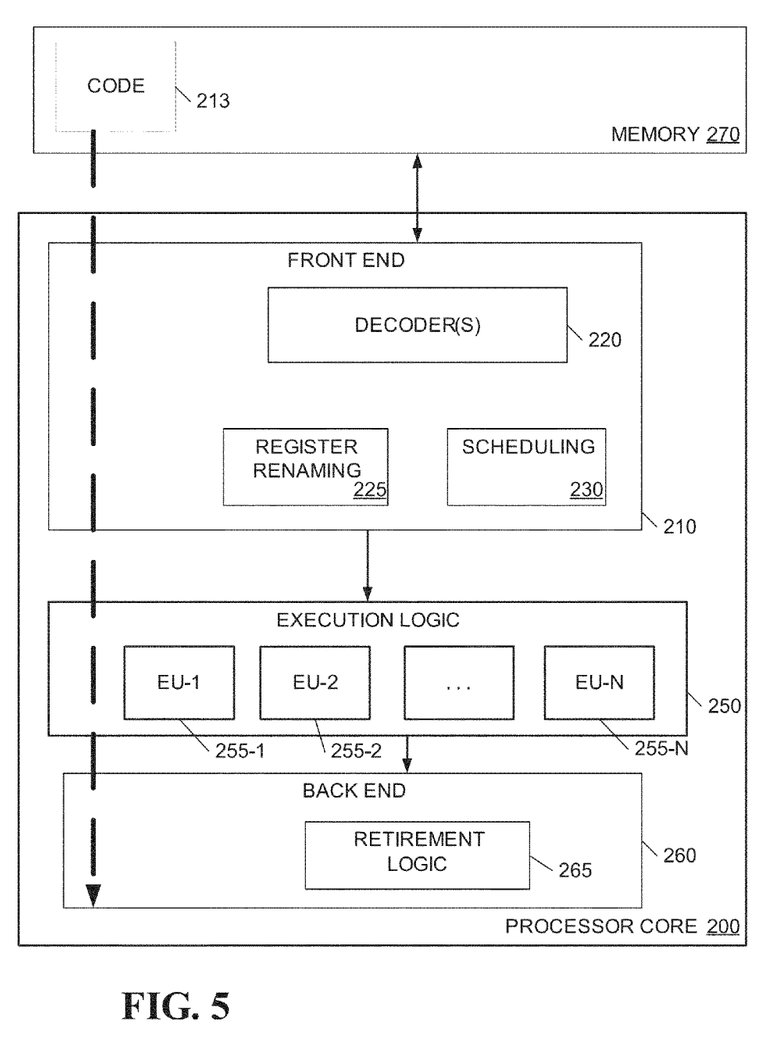
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the client logic architecture 46 (FIG. 3) or the backend logic architecture 46 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 6:
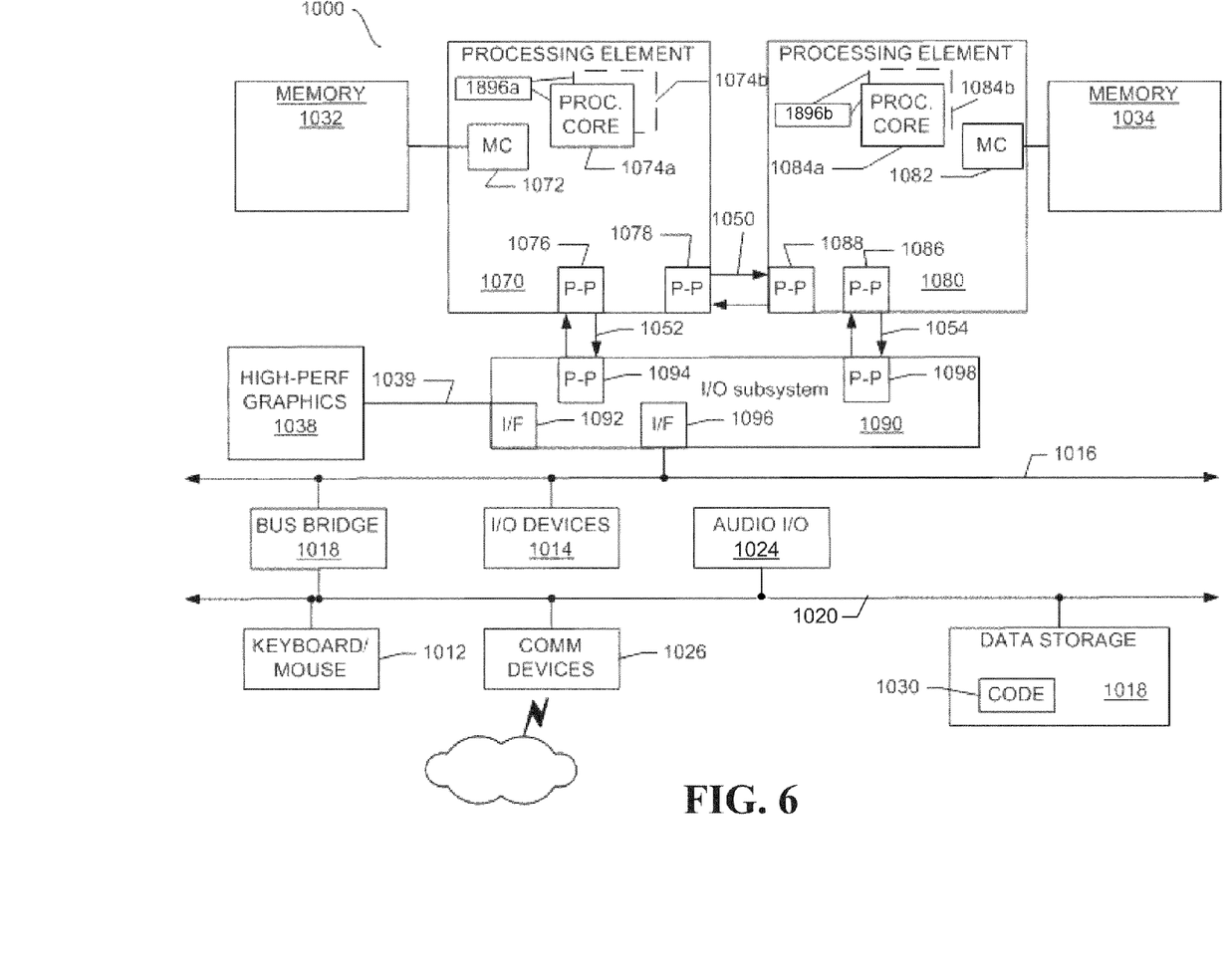
FIG. 6 is a block diagram of an example of a system according to an embodiment.

Referring now to FIG. 6, shown is a block diagram of a system embodiment 1000 in accordance with an embodiment of the present invention. Shown in FIG. 6 is a multi-processor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 5.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. In one example, the I/O subsystem 1090 may be used to implement the secure element 22 (FIG. 2A) and/or the secure element 36 (FIG. 2B) as a secure execution environment having integrated wireless information input, as already discussed. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the present invention is not so limited.

As shown in FIG. 6, various I/O devices 1014 may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1018 such as a disk drive or other mass storage device which may include code 1030, in one embodiment. In one example, web content is received via the communication devices 1026. The code 1030 may include instructions for performing embodiments of one or more of the methods described above. Thus, the illustrated code 1030 may implement the client logic architecture 46 (FIG. 3) or the backend logic architecture 46 (FIG. 3), and may be similar to the code 213 (FIG. 5), already discussed. Further, an audio I/O 1024 may be coupled to second bus 1020.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

Additional Notes and Examples

Example one may include a system to secure information, the system having a wireless interface, a processor to execute an operating system, and a secure element. The secure element may include a tunnel module to establish an out-of-band (OOB) channel between the wireless interface and a backend receiver, and an input module to receive information from a peripheral device via the wireless interface. The secure element may also include a pass-through module to send the information to the backend receiver via the OOB channel, wherein the OOB channel is to bypass the operating system.

Additionally, the secure element system of example one further may include a Bluetooth stack, wherein the pass-through module is to use the Bluetooth stack to receive the information from the peripheral device.

Additionally, the secure element may example one may further include a request module to receive a pass-through request from the backend receiver, and a virtualization module to pair the peripheral device with a secure virtual controller in the wireless interface in response to the pass-through request.

Moreover, the secure element of example one may further include a request module to receive a pass-through request from the backend receiver, and an enumeration module to assume control over the wireless interface in response to the pass-through request.

In addition, the secure element of example one may further include a confirmation module to generate a secure input notification that includes a predetermined secret.

In addition, the confirmation module of example one may present the secure input notification to a user via one or more of a display device of the system and the peripheral device.

Moreover, the secure element of example one may further include an application monitor to detect an application transition, an alert module to send an alert to the backend receiver via the out-of-band channel in response to the application transition, and a relinquishment module to discontinue the bypass of the local operating system in response to the application transition.

Additionally, the input module of any one of the aforementioned example one systems may receive the information from a wireless keyboard.

Example two may also include an apparatus to secure information, the apparatus having a tunnel module to establish an OOB channel between a local wireless interface and a remote backend receiver, and an input module to receive information from a peripheral device via a local wireless interface. A pass-through module may send the information to the backend receiver via the OOB channel, wherein the OOB channel is to bypass a local operating system.

Additionally, the apparatus of example two may further include a secure Bluetooth stack, wherein the pass-through module is to use the secure Bluetooth stack to receive the information from the peripheral device.

Additionally, the apparatus of example two may further include a request module to receive a pass-through request from the backend receiver, and a virtualization module to pair the peripheral device with a secure virtual controller in the local wireless interface in response to the pass-through request.

Moreover, the apparatus of example two may further include a request module to receive a pass-through request from the backend receiver, and an enumeration module to assume control over the local wireless interface in response to the pass-through request.

In addition, the apparatus of example two may further including a confirmation module to generate a secure input notification that includes a predetermined secret.

In addition, the confirmation module of example two may present the secure input notification to a user via one or more of a local display device and the peripheral device.

Moreover, the apparatus of example two may further include an application monitor to detect an application transition, an alert module to send an alert to the backend receiver via the out-of-band channel in response to the application transition, and a relinquishment module to discontinue the bypass of the local operating system in response to the application transition.

Additionally, the input module of any one of the aforementioned example two apparatuses may receive the information from a wireless keyboard.

Example three may also include at least one computer readable storage medium having a set of instructions which, if executed by a processor, cause a computer to establish an OOB channel between a local wireless interface and a remote backend receiver. The instructions, if executed, may also cause a computer to receive information from a peripheral device via the local wireless interface, and send the information to the backend receiver via the OOB channel, wherein the OOB channel is to bypass a local operating system.

Additionally, a Bluetooth stack of the processor in example three may be used to receive the information from the peripheral device.

Additionally, the instructions of example three, when executed, may cause a computer to receive a pass-through request from the remote backend receiver, and pair the peripheral device with a secure virtual controller in the local wireless interface in response to the pass-through request.

Moreover, instructions of example three, when executed, may cause a computer to receive a pass-through request from the remote backend receiver, and assume control over the local wireless interface in response to the pass-through request.

In addition, the instructions of example three, when executed, may cause a computer to generate a secure input notification that includes a predetermined secret.

In addition, the instructions of example three, when executed, may cause a computer to present the secure input notification to a user via one or more of a local display device and the peripheral device.

Moreover, the instructions of example three, when executed, may cause a computer to detect an application transition, send an alert to the backend receiver via the out-of-band channel in response to the application transition, and discontinue the bypass of the local operating system in response to the application transition.

Additionally, the information of example three may be received from a wireless keyboard.

Example four may also include an apparatus to secure information, the apparatus having means for performing a method according to any of examples one through three.

Example five may also include at least one computer readable storage medium having a set of instructions which, if executed by a processor, cause a backend receiver to establish an OOB channel between the backend receiver and a wireless interface of a remote computer. The instructions, if executed, may also cause the backend receiver to send a pass-through request to a secure element of the remote computer, and receive information from a peripheral device of the remote computer via the OOB channel, wherein the OOB channel is to bypass an operating system of the remote compute.

Additionally, the instructions of example five, when executed, may cause the backend receiver to communicate with a secure Bluetooth stack of the remote computer.

Additionally, the instructions of example five, when executed, cause the backend receiver to receive an alert from the remote computer, and wherein the alert is to correspond to an application transition on the remote computer.

Example six may also include a backend receiver having means for establishing an out-of-band channel between the backend receiver and a wireless interface of a remote computer, means for sending a pass-through request to a secure element of the remote computer, and means for receiving information from a peripheral device of the remote computer via the out-of-band channel, wherein the out-of-band channel is to bypass an operating system of the remote computer.

Additionally, the backend receiver of example six may further include means for communicating with a secure Bluetooth stack of the remote computer.

Additionally, the backend receiver of example six may further include means for receiving an alert from the remote computer, wherein the alert is to correspond to an application transition on the remote computer.

Techniques described herein may therefore enable the control of Bluetooth and other wireless communications using secure elements. Additionally, a complete end-to-end secure communications channel may be created between input devices and backend consumers of the information entered via those input devices. Accordingly, computing platforms may be more impervious to a set of attacks such as key loggers because any such malware may not have visibility to either input information or output information (e.g., as provided by other platform features such as WYSI-WYS/what you see is what you said). Additionally, techniques described herein may be used to secure operations that affect components such as BIOS (basic input output system), firmware upgrade requests, and so forth. For example, any BIOS configuration or any other operation that affects the platform may be required to use secured input or entered URLs (uniform resource locators) so that firmware sources may be validated and confirmed as being provided by the actual user.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size may be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising:
 a tunnel module, implemented in fixed-functionality logic hardware, to establish an out-of-band channel between a local wireless interface and a remote backend receiver;
 a request module, implemented in fixed-functionality logic hardware, to send a pass-through request to a client device;
 an enumeration module, implemented in fixed-functionality logic hardware, to assume control over the local wireless interface based on the pass-through request by preventing a local operating system from accessing the local wireless interface;
 an input module, implemented in fixed-functionality logic hardware, to receive information from a peripheral device via the local wireless interface;
 a pass-through module, implemented in fixed-functionality logic using hardware, to send the information from the peripheral device to the backend receiver via the out-of-band channel, wherein the out-of-band channel is to bypass the local operating system;
 an application monitor, implemented in fixed-functionality logic hardware, to detect an application transition away from an application involving a secure information entry; and
 a relinquishment module, implemented in fixed-functionality logic hardware, to discontinue the bypass of the local operating system in response to the detected application transition and send an alert to the backend receiver.

2. The apparatus of claim 1, further including a secure Bluetooth stack, wherein the pass-through module is to use the secure Bluetooth stack to receive the information from the peripheral device.

3. The apparatus of claim 2, further including:
 a request module to receive a pass-through request from the backend receiver; and
 a virtualization module to pair the peripheral device with a secure virtual controller in the local wireless interface in response to the pass-through request.

4. The apparatus of claim 2, further including: a request module to receive a pass-through request from the backend receiver.

5. The apparatus of claim 1, further including a confirmation module to generate a secure input notification that includes a predetermined secret.

6. The apparatus of claim 5, wherein the confirmation module is to present the secure input notification to a user via one or more of a local display device and the peripheral device.

7. The apparatus of claim 1, further including:
 an alert module to send the alert to the backend receiver via the out-of-band channel in response to the application transition.

8. The apparatus of claim 1, wherein the input module is to receive the information from a wireless keyboard.

9. The apparatus of claim 1, further including the wireless interface.

10. The apparatus of claim 1, further including a processor to execute the local operating system.

11. At least one non-transitory computer readable storage medium comprising a set of instructions which, when executed by a processor, cause a computer to:
- establish an out-of-band channel between a local wireless interface and a remote backend receiver;
- send a pass-through request to a client device;
- assume control over the local wireless interface based on the pass-through request by preventing a local operating system from accessing the local wireless interface;
- receive information from a peripheral device via the local wireless interface;
- send the information to the backend receiver from the peripheral device via the out-of-band channel, wherein the out-of-band channel is to bypass the local operating system,
- detect an application transition away from an application involving a secure information entry; and
- discontinue the bypass of the local operating system in response to the detecting of the application transition and send an alert to the backend receiver.

12. The at least one non-transitory computer readable storage medium of claim 11, wherein a Bluetooth stack of the processor is to be used to receive the information from the peripheral device.

13. The at least one non-transitory computer readable storage medium of claim 11, wherein the instructions, when executed, cause a computer to:
- receive a pass-through request from the remote backend receiver; and
- pair the peripheral device with a secure virtual controller in the local wireless interface in response to the pass-through request.

14. The at least one non-transitory computer readable storage medium of claim 12, wherein the instructions, when executed, cause a computer to:
- receive a pass-through request from the remote backend receiver.

15. The at least one non-transitory computer readable storage medium of claim 11, wherein the instructions, when executed, cause a computer to generate a secure input notification that includes a predetermined secret.

16. The at least one non-transitory computer readable storage medium of claim 15, wherein the instructions, when executed, cause a computer to present the secure input notification to a user via one or more of a local display device and the peripheral device.

17. The at least one non-transitory computer readable storage medium of claim 11, wherein the instructions, when executed, cause a computer to:
- send the alert to the backend receiver via the out-of-band channel in response to the application transition.

18. The at least one non-transitory computer readable storage medium of claim 11, wherein the information is to be received from a wireless keyboard.

19. At least one non-transitory computer readable storage medium comprising a set of instructions which, when executed by a processor, cause a backend receiver to:
- establish an out-of-band channel between the backend receiver and a wireless interface of a remote computer;
- send a pass-through request to a secure element of the remote computer;
- assume control over the local wireless interface based on the pass-through request by preventing a local operating system of the remote computer from accessing the wireless interface;
- receive information from a peripheral device of the remote computer via the out-of-band channel, wherein the out-of-band channel is to bypass the local operating system of the remote computer,
- detect an application transition away from an application involving a secure information entry; and
- discontinue the bypass of the local operating system in response to the detecting of the application transition and send an alert to the backend receiver.

20. The at least one non-transitory computer readable storage medium of claim 19, wherein the instructions, when executed, cause the backend receiver to communicate with a secure Bluetooth stack of the remote computer.

21. The at least one non-transitory computer readable storage medium of claim 19, wherein the instructions, when executed, cause the backend receiver to receive the alert from the remote computer, and wherein the alert is to correspond to an application transition on the remote computer.

* * * * *

UNITED STATES PATENT AND TRADEMARK OFFICE
CERTIFICATE OF CORRECTION

PATENT NO. : 9,705,916 B2  
APPLICATION NO. : 13/629965  
DATED : July 11, 2017  
INVENTOR(S) : Omer Ben-Shalom et al.

Page 1 of 1

It is certified that error appears in the above-identified patent and that said Letters Patent is hereby corrected as shown below:

On the Title Page

Item (72), Line 1, delete "le-Tzion" and insert -- Le Tzioin --

In the Claims

In Column 12, Line number 27, in Claim 1, after logic delete "using"

In Column 13, Line number 29, in Claim 13, delete "11" and insert -- 12 --

Signed and Sealed this  
Sixth Day of February, 2018

Joseph Matal  
*Performing the Functions and Duties of the*  
*Under Secretary of Commerce for Intellectual Property and*  
*Director of the United States Patent and Trademark Office*